United States Patent [19]

Allison

[11] Patent Number: 5,412,905
[45] Date of Patent: May 9, 1995

[54] TOMATO GREEN HOUSE

[76] Inventor: Ian T. Allison, P.O. Box 1705, Santa Rosa, Calif. 95402

[21] Appl. No.: 93,635

[22] Filed: Jun. 21, 1993

[51] Int. Cl.6 .............................................. A01G 13/00
[52] U.S. Cl. .......................................... 47/30; 47/45; 47/DIG. 6
[58] Field of Search ............. 47/DIG. 6, 32.1, 17 FM

[56] References Cited

U.S. PATENT DOCUMENTS

| | | | |
|---|---|---|---|
| 3,352,058 | 11/1967 | Brant | 47/DIG. 6 |
| 4,267,665 | 5/1981 | Wallace | 47/29 |
| 4,858,380 | 8/1989 | Gayle | 47/45 R |
| 5,138,792 | 8/1992 | Allingham | 47/DIG. 6 |

FOREIGN PATENT DOCUMENTS

| | | | |
|---|---|---|---|
| 1165212 | 10/1958 | France | 47/29 |
| 2530002 | 1/1984 | France | 47/DIG. 6 |
| 3809098 | 9/1989 | Germany | 47/29 |
| 27540 | 3/1978 | Japan | 47/DIG. 6 |
| 47095 | 10/1985 | Japan | 47/29 |
| 47096 | 10/1985 | Japan | 47/29 |

*Primary Examiner*—Henry E. Raduazo

[57] ABSTRACT

A single unit plant protection device in a vertical open top cone configuration. Fabricated from recycled plastic material to form a blanket of bubbles or dead air cells. Tinted green to aid in heat absorption while still allowing light to penetrate through to young plants. Designed to slip over an inverted 12"×33" three wire tomato cage for support. Functions as a barrier against cold, wind, insects, and disease. May be reversed after last frost to provide protection for balance of plant's life while tomato cage provides structural support to plant.

5 Claims, 6 Drawing Sheets

TOMATO GREEN HOUSE

FIELD OF INVENTION

This invention relates to plant protection for both vegetables and flowers but most commonly used in the protection of tomato plants. Protection by use of this device is afforded from cold, wind, insects, and disease.

BACKGROUND OF THE INVENTION

Applicant has filed a design patent application on Jul. 9, 1992, under Ser. No. 07/911,039 with the same title "Tomato Green House." No action has been taken to date on this application by the Patent and Trademark Office other than designating a Preliminary Class: D25 and granting a Foreign Filing License on Jul. 22, 1992.

Plant protectors heretofore have been designed to protect young plants against frost damage by covering the plant with some form of barrier. These barriers were designed to retain available heat surrounding the plant prior to a temperature drop that may be sufficient to freeze the subject plant. Parchment domes, plastic tunnels, and water-filled plastic flutes have all been used in an attempt to afford protection from freezing with various degrees of success.

One of the early popular plant protectors was known as the Hot Cap. This parchment dome cover which was sealed at the bottom by covering the parchment flanges with soil, afforded protection from wind and bugs but minimal protection from frost due to the minor insulation value of the paper thin parchment cover. The greatest disadvantage of the Hot Cap was the gardener's inability to see the plant and its needs for water and weeding. Eventually the gardener had to cut open the Hot Cap to release too much entrapped heat or to test the soil for proper moisture requirements directly beneath the plant. A surprising number of weeds could grow under the Hot Cap unbeknown to the gardener, choking out the primary plant.

A more recent state-of-the-art device, the Wall O'-Water is comprised of opaque plastic flutes which when filled with water act as a wall around the subject plant. The theory is that the water absorbs heat during the sunlight hours and releases same during the night or at any time during a temperature drop to retain a higher temperature around the plant inside the wall. In actuality the white wall of water reflects heat rather than absorbing heat and the 3 gallons of water trapped in the plastic flutes is a much better conductor of heat than an insulator against cold. The gardener is required to fill some 18 flutes with water for each plant protected. The flutes can leak and rupture causing collapse of the protecting wall and damage to the plant.

It is the purpose of the present invention to provide an improvement over previous known state of the art by eliminating the problems heretofore known.

SUMMARY OF THE INVENTION

A plastic bubble-pack of a heavier gauge than that used in the packing industry for damage protection and insulation is fabricated into the form of an open top tent to slip over a common wire tomato cage. This forms a wigwam shaped tent whose most common dimension is a 12" base with a 9" open top. See FIG. 1. There are approximately 40 million tomato cages fabricated and sold each year of which 70% are of the standard 12"×33" three wire form per information supplied by Woodstock Wire Works, Inc., of Vernon, Calif. See FIG. 3. It is estimated that over 100 million tomato cages of the 12"×33" dimension are in the backyards of the 30 million vegetable gardening families in the United States.

The invention is fabricated from recycled green plastic material enclosing a close knit pattern of air bubbles now presently produced by the AVI Corporation at various manufacturing plants throughout the United States. UV inhibitors can be included in the plastic composition to extend life of the plastic material. The invention by nature of its fabrication absorbs heat (green absorbs/white reflects) and the dead-air pockets act as highly efficient insulators in comparison to the conductivity of water. The invention affords visibility of the plant by the gardener for moisture, insect, and weed inspection.

The invention affords protection from wind, bugs, and air-borne diseases. The invention heats a supply of dead-air pockets by absorption during the sunlight hours and very slowly gives off these trapped BTU to the air surrounding the plant to compensate for and/or to slow down any temperature drop during frost conditions. The invention also transmits heat to the underlying soil during sunlight hours from heat generated by absorption. The invention is in reality a solar green house and marketed under a trademark name of SOLAR START TM. Said trademark has been issued by the U.S. Patent and Trademark Office under No. 1,771,448 on May 18, 1993.

The object of this invention will be further disclosed and enhanced when consideration is given to the drawings and description to follow.

REFERENCE NUMERALS IN DRAWINGS

| 14 base | 15 top |
| 16 seam | 17 seam |
| 18 ring 12" | 19 ring 9" |
| 20 smaller opening | 21 wire legs |
| 22 plant base | |

DESCRIPTION OF THE INVENTION

Figure 1:
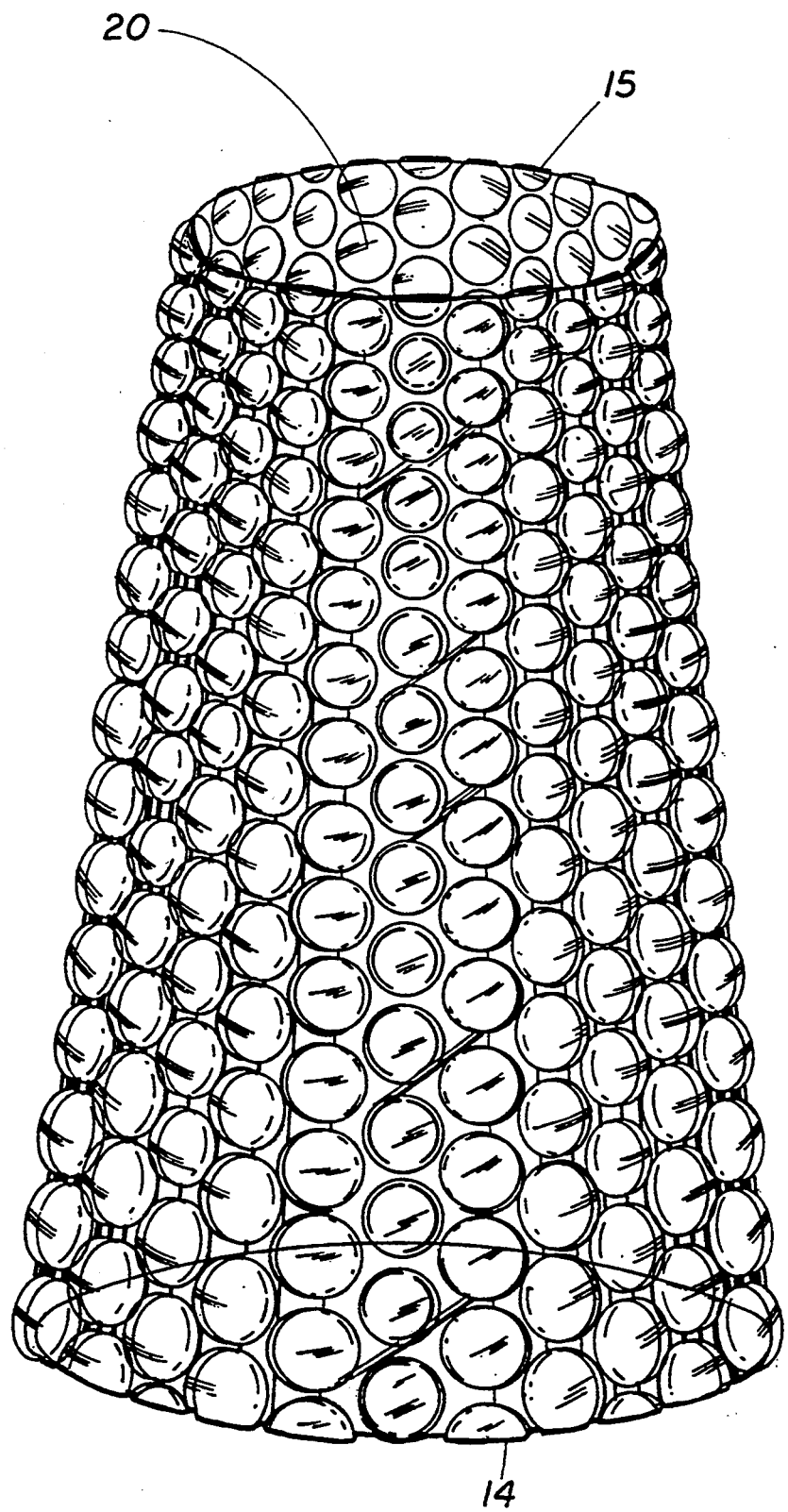
FIG. 1: Perspective front view of invention.
Figure 3:
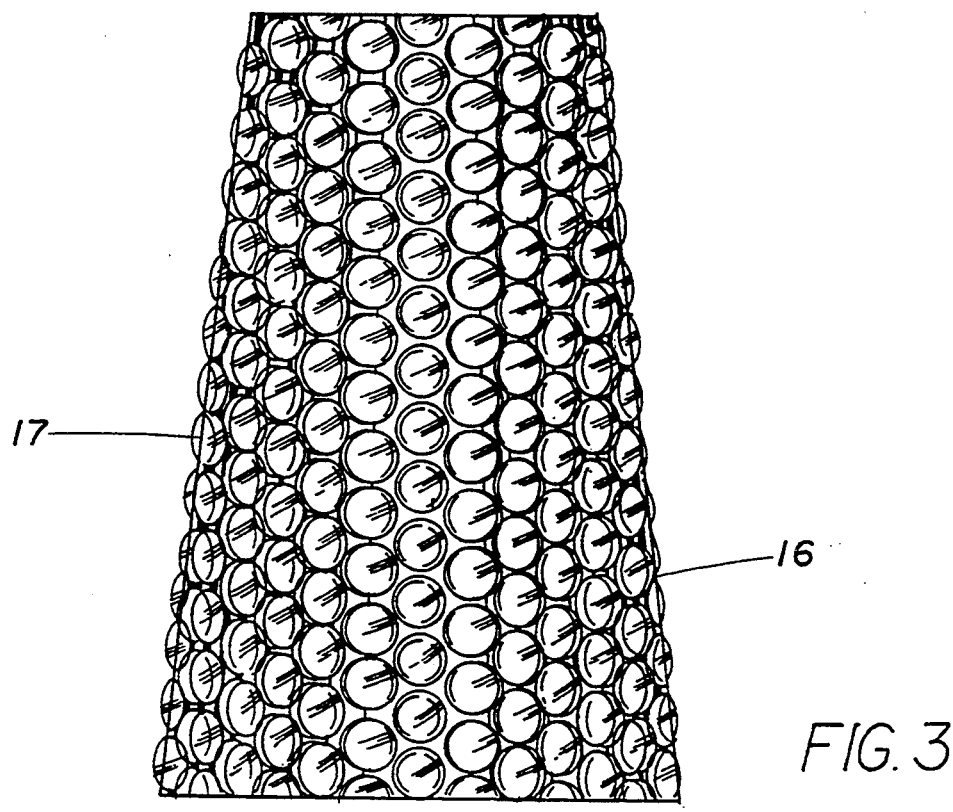
FIG. 3: Perspective front view of wire tomato cage used to support invention.

FIG. 1 shows a perspective view of the applicant's invention, the Tomato Green House, fabricated from recycled linear low density polyethylene or other lightweight material capable of air entrapment in the manufacture. The base 14 is 12-inches in diameter and the top 15 is 9-inches in diameter. These dimensions coincide with the ring dimensions of the standard 12"×33" wire tomato cage used as a support. See FIG. 3, 18 and 19 for these wire ring locations. The invention is not limited to these dimensions but may be enlarged or decreased to adapt to various types and sizes of supports. A rigid material may be used without supports if it is capable of retaining trapped air cells in its manufacture and allows the passage of light.

Figure 2:
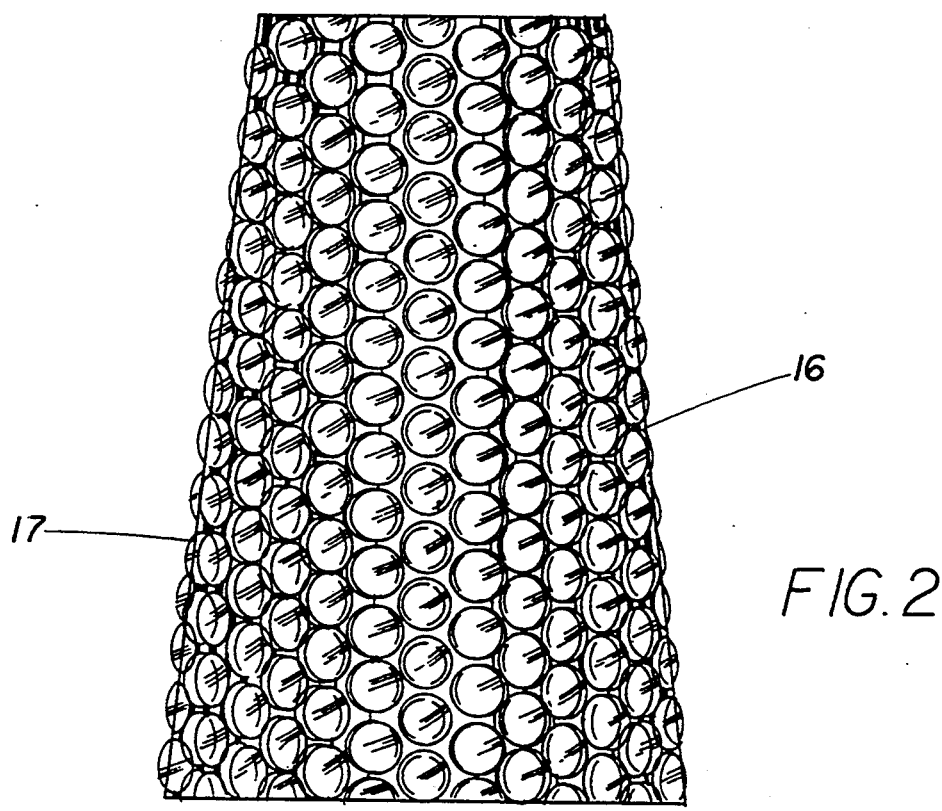
FIG. 2: Flat panels of material heat welded together to form final invention.

The plastic material presently proven as the most practical to fabricate this invention is now produced by Astro-Valcour, Inc., at eleven locations in the United States. Their trade name for the material is LRP Astro-Cell. Flat panels as shown in FIG. 2 are cut and welded together at 16 and 17 in a heat process on special machinery designed and operated by Richter Manufacturing Co., at 159 North San Antonio Avenue, Pomona, Calif. 91767.

The invention is comprised of one part and made of material readily available from other manufacturers than those indicated above. Other materials and other manufacturers from time to time may be available in the future to fabricate the invention in such a manner to still produce the unique functions claimed by the applicant for this invention.

OPERATION OF INVENTION

Figure 4:
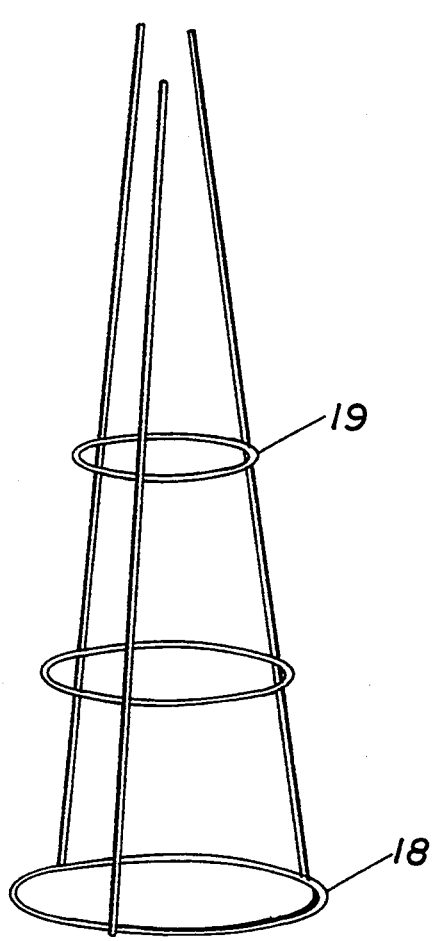
FIG. 4: Primary and secondary position use of invention.

There are two simple positions for use of the invention as shown in FIG. 4 as the primary and secondary position. The primary position is used prior to the first customary normal frost free day in the spring. The wider opening at the base 14 in FIG. 1 is placed on the ground over the plant requiring protection. Through entrapment of ultra violet rays and absorption of solar heat generated by the strategically tinted green opaque Astro-Cell, an abundance of heat energy is generated while allowing ample light to penetrate through to the young plant inside. The invention compensates for excess temperature by the open top shown as 15 in FIG. 1 which allows expanding hot air to escape vertically when enough thermal differential is created between the outside air temperature and the inside air temperature. The absorption of heat by the green tent not only increases the air temperature within the Tomato Green House but also transmits same to the underlying soil so necessary for "cold weather" plant survival and growth. The small opening at the top, shown as 20 FIG. 1, provides adequate space to observe the plant, water and fertilize it, and watch it grow.

Figure 5:
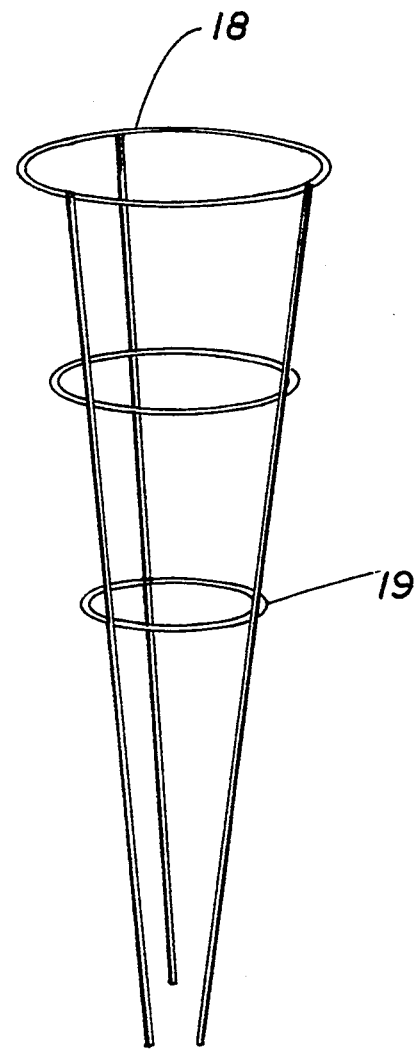
FIG. 5: Perspective front view of invention in secondary position together with plant support.
Figure 6:
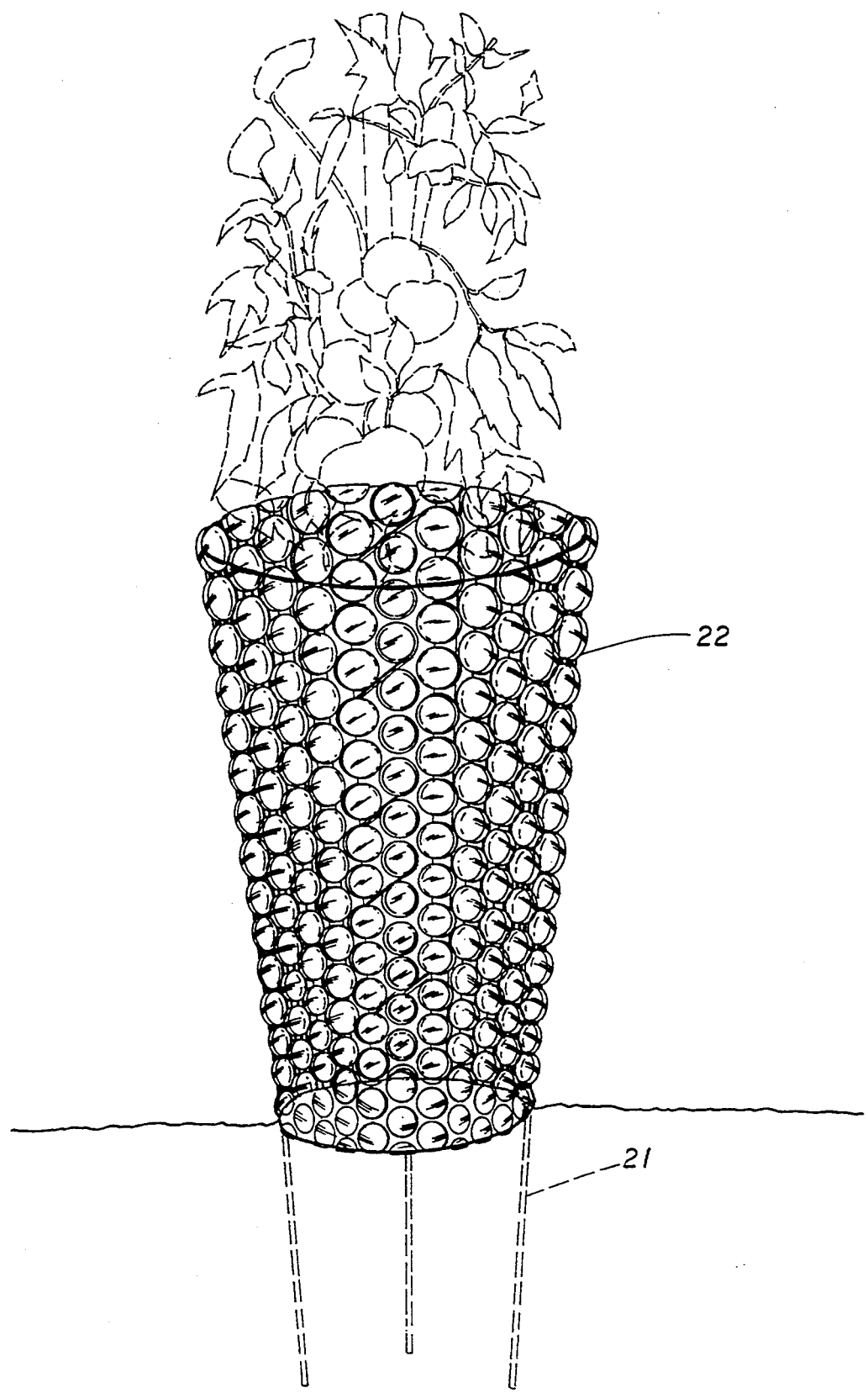
FIG. 6: Inverted view shown in perspective
Figure 7:
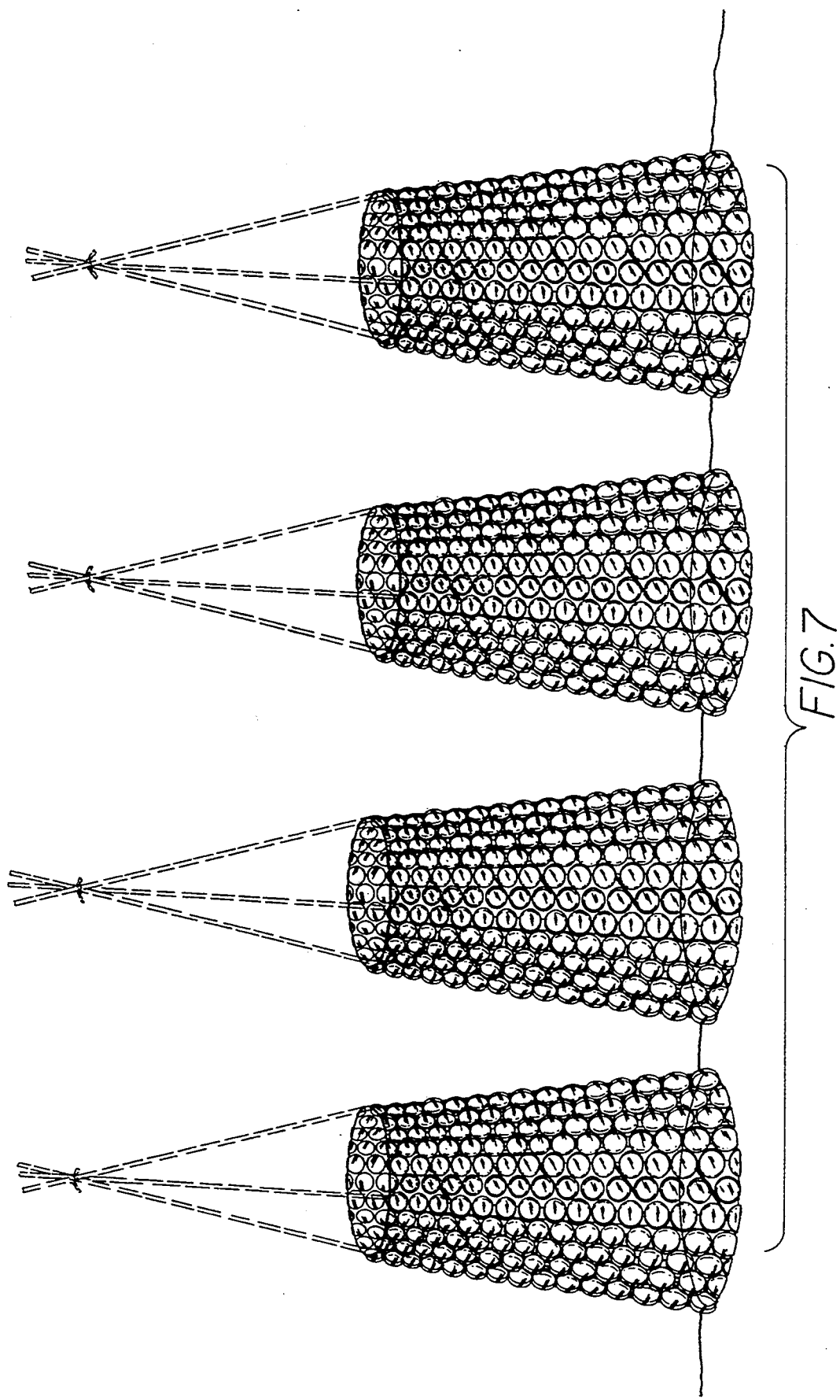
FIG. 7: Perspective view of a row formation with a wire frame
Figure 8:
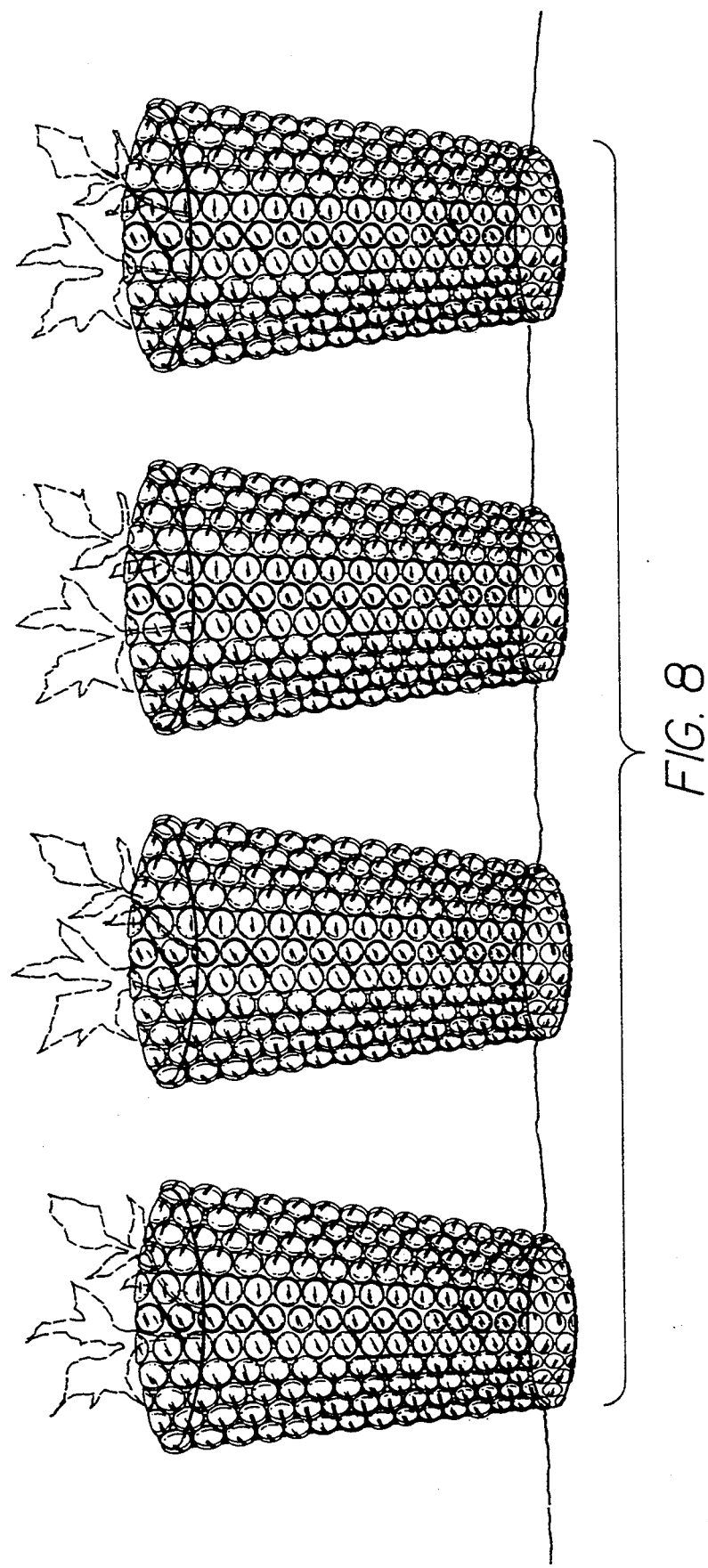
FIG. 8: Inverted perspective view of a row formation.

The secondary position is used for the invention as shown in FIG. 4. This is done by a 180% reverse vertical position of the invention and its supporting wire frame tomato cage. In fact, the tomato cage which is now embedded in the soil by inserting its long wire legs 21 in FIG. 5 is in its normal position to act as a plant support. The reversal of the invention changes its posture to an all season protector against wind, bugs, and disease. Field trials at The Seed Corps experimental gardens in Santa Rosa, Calif., have shown that bugs are hesitant to enter the area enclosed by the invention. Further evidence at these field trials indicate a remarkable drop in wind-born disease attacks such as Tobacco Mosaic and Rust. Even though frost may be over, many windy and turbulent rainy days subject plants to physical damage and sudden temperature changes. The invention surrounding the base of the plant, shown as 22 in FIG. 5, gives considerable protection against these harmful conditions.

CONCLUSIONS, RAMIFICATIONS, AND SCOPE OF INVENTION

The object of the invention is to obtain an earlier supply of tomatoes or any other vegetable or flower and to improve the quality of plant propagation with minimum work and equipment. The simplicity of a well insulated plant cover designed to enhance the use of a common garden device, the wire tomato cage, is unique in its application. Many said the Bobby Pin was only a piece of wire but it was the inventor's unique use of the wire that gave value to the Bobby Pin invention. The Tomato Green House outwardly looks like common bubble-pack but it is the unique application of its use that gives value to this invention.

While the above description contains many specificities, these should not be construed as limitations on the scope of the invention, but rather as an exemplification of one preferred embodiment thereof. For example, a rigid form of plastic, light in weight, transparent to sunlight with high BTU absorptive capabilities and a high K factor through trapped air or even injected gases or eutectic solutions may provide the same benefits as that form of the invention described heretofore.

I claim:

1. A single unit plant protector device for forming an insulating blanket comprising a sheet of green plastic including a series of trapped air cells, said blanket being cone-shaped and of a size adapted to enclose young plants whereby they may be protected from early frost.

2. A single unit plant protector as in claim 1 wherein said sheet of green plastic is a flaccid material and is adapted to be supported by a standard tomato cage.

3. A plant support and single unit plant protector comprising:
   a standard sized cone-shaped tomato cage, and
   a protector device for forming an insulating blanket about said cage, said protector device comprising a sheet of green plastic including a series of trapped air cells, said blanket having a cone-shape with a small diameter base and a large diameter base and being of a size and shape adapted to enclose said tomato cage and protect a young plant whereby a plant may be protected form early frost by said protection device and later supported by said tomato cage.

4. A plant support and protector device of claim 3 wherein the tomato cage is positioned over said plant in an inverted condition and the protector encloses the plant and cage with the small diameter base positioned above the large diameter base.

5. A plant support and protection device of claim 3 where the tomato cage is positioned over said plant in a conventional configuration and the protector device encloses the plant and cage with the large diameter base positioned above the small diameter base.

* * * * *